3,242,207
CONTINUOUS OXIDATION OF d-GLUCOSE WITH HNO$_3$ IN THE PRESENCE OF A REACTION PRODUCT OF THE SAME TO PRODUCE SACCHARIC ACID
Hans Ulrich Gassmann, Allschwil, Arthur Krauer, Reinach, Basel-Land, Erich Matter, Basel, and Ernst Leumann, Arlesheim, Switzerland, assignors to Ciba Limited, Basel, Switzerland, a Swiss company
No Drawing. Filed Mar. 7, 1962, Ser. No. 177,996
Claims priority, application Switzerland, Mar. 14, 1961, 3,080/61
2 Claims. (Cl. 260—528)

It is known that oxidation of glucose with nitric acid at an elevated temperature furnishes saccharic acid. Since this oxidation reaction is strongly exothermic and in addition also proceeds autocatalytically, it is difficult in the large-scale manufacture of saccharic acid to control the reaction accurately. After an initial delay the oxidation reaction may proceed very vigorously and even explosively. Apart from the danger involved in such a reaction course the considerable amount of heat evolved may reduce the yield of saccharic acid to an uneconomic level. For the large-scale manufacture of saccharic acid it has hitherto been necessary, out of considerations of safety, to carry out the oxidation of glucose with nitric acid in relatively small batches.

It has now been found that saccharic acid can be manufactured by oxidation of d-glucose with the aid of nitric acid at an elevated temperature in an advantageous manner under safe conditions by conducting the reaction continuously in the following manner: To an initial reaction mixture, prepared by oxidizing an aqueous solution of d-glucose with concentrated nitric acids, is added at 40 to 70° C. simultaneously and continuously an aqueous d-glucose solution and concentrated nitric acid in the molecular ratio of 1:3 to 1:3.5, continuously withdrawing from the reaction vessel a portion of reaction mixture corresponding to the volume of the fed-in liquids, and isolating the saccharic acid formed.

The nitric acid used in the present process, that is to say for the manufacture of the initial reaction mixture and the continuous oxidation, should have a concentration of at least 85%.

A particularly suitable initial reaction mixture (prepared by oxidizing an aqueous solution of d-glucose [grape sugar] by means of concentrated nitric acid) for use in the present process is obtained by oxidizing 1 molecular proportion of d-glucose in water with 3 to 3.5 molecular proportions of concentrated nitric acid at 40 to 70° C. The initial reaction mixture, that is to say the starting material present at the beginning of the continuous manufacture of saccharic acid, is advantageously prepared by adding at 40 to 70° C. to the aqueous d-glucose solution (preferably of about 35 to 45% strength, which contains a small amount of sodium nitrite) at first about one third to one half of the total amount of concentrated nitric acid required for complete conversion, then adding the remainder of concentrated nitric acid when the reaction has subsided, and finally leaving the reaction mixture to itself until the oxidation reaction has subsided.

The present process for the manufacture of saccharic acid is carried out continuously. To the initial reaction mixture is continuously added, for example with the aid of a measuring pump, an aqueous d-glucose solution preferably having about 35 to 45% strength, and at the same time concentrated nitric acid, in the molecular ratio of 1:3 to 1:3.5. During this operation the temperature should be at least 40° C. and at most 70° C., ranging preferably from about 58 to 65° C. A portion of the reaction mixture corresponding to the volume of fed-in liquids is continuously withdrawn from the reaction mixture, for example with the aid of an immersion pump, and pumped into a second reaction vessel where the reaction is allowed to subside.

Whenever the continuous process is interrupted, the oxidation reaction is very simple to restart. For this purpose—when the supply of d-glucose solution and nitric acid has ceased—the first reaction vessel is not completely evacuated but a portion of the reaction mixture, corresponding for instance to the level tube of an immersion pump, is left in the reaction vessel. To this portion of the reaction mixture (which before its use may have been standing for up to 5 days), if desired after admixture of a small amount of sodium nitrite, there are added at 40 to 70° C., preferably at 58 to 65° C., again simultaneously and continuously, the two reactants, that is to say aqueous d-glucose solution and concentrated nitric acid, in the molecular proportions specified above, and a portion of the reaction mixture corresponding to the fed-in starting materials is continuously transferred to another vessel where it remains until the reaction has subsided.

The isolation of the saccharic acid formed from the resulting reaction mixtures follows the usual pattern: The saccharic acid is isolated, for example, in known manner from the reaction mixtures in the form of monopotassium saccharate.

Unless otherwise indicated, parts and percentages in the following examples are by weight.

*Example 1*

A reaction vessel is charged with 53.2 parts of an aqueous d-glucose solution of 42.5% strength. 0.12 part of an aqueous sodium nitrite solution of 25% strength is added, and the mixture is heated with stirring at 60° C. By means of a measuring pump 10 parts of concentrated nitric acid (of 98% strength) are run in within 7 minutes. By suitable adjustment of the bath temperature the internal temperature is maintained at 62 to 64° C. After ½ hour the oxidation process sets in and subsides soon afterwards, whereupon 17 parts of concentrated nitric acid (of 98% strength) are added within 35 minutes, during which the temperature is kept constant at 60 to 62° C.

160 parts of aqueous d-glucose solution of 42.5% strength and 81 parts of concentrated nitric acid (of 98% strength) are simultaneously stirred into the above initial reaction mixture at 60 to 62° C., the amounts of the d-glucose solution and the nitric acid being maintained exactly at the specified ratio by means of a measuring pump. The level of the reaction mixture in the vessel is kept constant by means of an immersion pump, that is to say that the portion of reaction mixture corresponding to the volume of the fed-in liquids is continuously withdrawn and pumped into another reaction vessel preheated at 50° C.

When the specified amounts of d-glucose solution and nitric acid have been added, the remainder of the reaction mixture, together with the reaction mixture left in the first reaction vessel, is stirred for another 8 to 10 hours at 60 to 62° C.

After cooling, the saccharic acid formed is isolated from the reaction mixture in the form of monopotassium saccharate. The yield of saccharic acid amount to 37 to 38% of the theoretical or respectively to 46 to 48.5 parts of monopotassium saccharate.

*Example 2*

Instead of the initial reaction mixture used in Example 1 there are used in this example 50 to 100 parts by volume of the reaction mixture which remained in the first reaction vessel after continuous addition of the reactants according to Example 1. The reaction mixture is mixed with 0.15 part of a sodium nitrite solution of 25% strength and heated to 63–65° C.

An aqueous d-glucose solution of 42.5% strength and concentrated nitric acid (of 98% strength) are stirred in simultaneously and continuously at 60 to 62° C., at a rate such that within 2 to 2½ hours 213 parts of d-glucose solution and 108 parts of nitric acid are introduced into the reaction vessel. The portion of reaction mixture corresponding to the volume of the fed-in liquids is continuously withdrawn and pumped into another reaction vessel preheated to 50° C. When the specified amounts of d-glucose solution and nitric acid have been added, the portion of reaction mixture pumped into a further vessel is stirred for another 8 to 10 hours at 60 to 62° C. The saccharic acid so formed is then precipitated in known manner in the form of monopotassium saccharate. The yield of saccharic acid amounts to 39–41% of the theoretical.

What is claimed is:

1. Process for the manufacture of saccharic acid by oxidation of d-glucose with nitric acid, which process comprises adding at a temperature ranging from 40 to 70° C. continuously and simultaneously to a reaction mixture
    prepared by oxidizing at a temperature ranging from 40 to 70° C. 1 molecular proportion of d-glucose in water with 3 to 3.5 molecular proportions of concentrated nitric acid
an aqueous solution of d-glucose and concentrated nitric acid in the molecular ratio of 1:3 to 1:3.5, continuously withdrawing a portion of the reaction mixture corresponding to the volume of the added liquids, and then isolating the saccharic acid formed.

2. Process for the manufacture of saccharic acid by oxidation of d-glucose with nitric acid, which process comprises adding at a temperature ranging from 58 to 65° C. continuously and simultaneously to a reaction mixture
    prepared by oxidizing at a temperature ranging from 58 to 65° C. 1 molecular proportion of d-glucose in the form of an aqueous solution of 35 to 45% strength with 3 to 3.5 molecular proportions of concentrated nitric acid of 85 to 98% strength
an aqueous solution of d-glucose of 35 to 45% strength and concentrated nitric acid of 85 to 98% strength in the molecular ratio of 1:3 to 1:3.5, continuously withdrawing a portion of reaction mixture corresponding to the volume of the added liquids, and then isolating the saccharic acid formed.

References Cited by the Examiner

UNITED STATES PATENTS 2,436,659  2/1948  Mehltretter _____ 260—528

OTHER REFERENCES

Danckwerts: Chemical Engineering Science (Genie Chimique), vol. 2, pages 1–13 (1953).

Weissberger: Technique of Organic Chemistry, vol. VIII, pages 130–133, 287–290 and 423, Interscience Publishers, Inc., New York (1953).

LORRAINE A. WEINBERGER, *Primary Examiner.*

CHARLES B. PARKER, LEON ZITVER, *Examiners.*

United States Patent Office 3,242,208
Patented Mar. 22, 1966

3,242,208
BIS (TRIFLUOROMETHYL) THIO CARBANILIDES
Henry Martin, Basel, Switzerland, assignor to Ciba Limited, Basel, Switzerland, a company of Switzerland
No Drawing. Filed Feb. 18, 1965, Ser. No. 433,776
Claims priority, application Switzerland, Apr. 21, 1961, 4,682/61
6 Claims. (Cl. 260—552)

This is a continuation-in-part of my application, Serial No. 323,539, filed October 28, 1963, now abandoned, and of application Serial No. 188,521, filed April 18, 1962, now Patent No. 3,151,023.

The present invention provides compounds of the Formula I

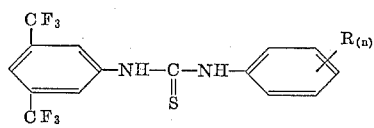

in which R represents a member selected from the group consisting of a fluorine, chlorine and bromine atom, a lower alkyl, alkoxy, —$CF_3$, —$SO_2NH_2$, —$NO_2$, —CN, —SCN, —$NR_2'$, —COOR', —$SO_2R'$, —COR' and —SR' group, wherein R' has the meaning of a lower alkyl group and $n$ is a whole number of at most 3.

The compounds of the general Formula I have a pronounced action against fungi and bacteria that cause plant diseases. These compounds are especially active against phytopathogenic fungi.

In this connection it is an important advantage that, when used at concentrations such as are required for the combating of parasites, the aforesaid compounds have no toxic side-effects on crop plants.

Furthermore, the compounds of the above Formula I exhibit an excellent action against certain phytopathogenic bacteria such, for example, as those of the genus Corynebacterium. A particularly strong anti-bacterial action is exhibited, for example, by the compound of the formula

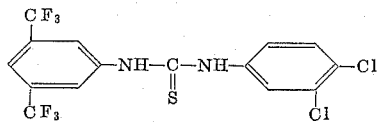

which, even when used at a concentration of 0.001 part per million, still exhibits an inhibitive action, as can be demonstrated, for example, by a dilution test with a culture of Staphylococcus aureus in glucose broth.

It is especially important that the compounds of the invention do not lose their action against phytopathogenic microorganisms in the presence of surface-active substances.

As examples of the use of the compounds of the general Formula I for plant protection there may be mentioned the treatment of plant seeds and of plants in various stages of development, and also treatment of the soil in which the plants grow, to protect them from harmful microorganisms.

The compounds of the general Formula I can be made by methods in themselves known. For example, a compound of the general formula

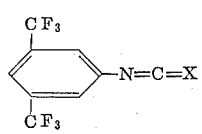

in which X represents a sulfur atom, may be reacted with a compound of the general formula

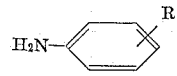

in which R and $n$ have the meanings given in defining the above general Formula I; or a compound of the general formula

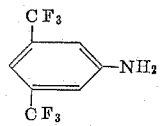

may be reacted with a compound of the general formula

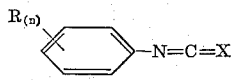

in which R, $n$ and X have the meanings given above.

Thus, to make a compound of the general Formula I, for example, 3:5-bis-trifluoromethylphenyl isothiocyanate is reacted with one of the following compounds:

Aniline or a substituted aniline such, for example, as para-chloraniline, 3:4-dichloraniline, 3:5-dichloraniline, 2:5-dichloraniline, 3:4:5-trichloraniline, 2:4:5-trichloraniline, 3-chloro-4-bromaniline, 3-chloro-4-methoxyaniline, 3-chloro-4-methylaniline, 3-trifluoromethylaniline, 2-chloro - 5 - trifluoromethylaniline, 3 - trifluoromethyl-4-chloraniline, 3:5-bis-trifluoromethylaniline, 4-bromaniline, 2:4-dichloraniline, 4-aminobenzenesulfonylamide, 4-aminobenzoic acid methyl ester, 4-butoxyaniline, 4-thiocyaniline, 4 - aminoacetophenone, 4 - aminophenylacetic acid methyl ester, 3-bromaniline, 4-chloro-3-methylaniline, 4-chloro-2-methylaniline, 3:5-dichloro-4-methylaniline or 4-chloro-3:5-dimethylaniline; hydroxyaminobenzenes such, for example, as 4-chloro-2-amino-1-hydroxybenzene, 5-chloro - 2 - amino - 1-hydroxybenzene, 4:5-dichloro - 2 - amino - 1 - hydroxybenzene, 3:4:6-trichloro-2-amino-1-hydroxybenzene, 4- or 5-bromo-2-amino-1-hydroxybenzene, 4:6-dibromo- or 4:6-dichloro-2-amino-1-hydroxybenzene, 4:5-dibromo-2 - amino - 1 - hydroxybenzene, or 4-chloro-3-trifluoromethyl-2-amino-1-hydroxybenzene.

Alternatively, 3:5-bis-trifluoraniline may be reacted with a phenyl isothiocyanate, for example, one that contains one or more nitro groups, such as 4-nitrophenyl isothio-cyanate, 3-nitro- or 2-nitro-phenyl isothio-cyanate, 4-methyl-3-nitrophenyl isothio-cyanate, 4-chloro-3-nitrophenyl isothio-cyanate, 2-nitro-4-chlorophenyl isothio-cyanate, 2-methyl-4-nitro-5-chlorophenyl isothio-cyanate, 2-methoxy-4-nitro-5-chlorophenyl-isothio-cyanate or 2:4-dinitrophenyl iso-thio-cyanate.

The compounds of the general Formula I can also be prepared by other methods, for example, by reacting a reactive derivative of thiocarbonic acid, for example, carbon disulfide, with an appropriately substituted aromatic amine.

The following examples illustrate the invention, the parts and percentages being by weight.

*Example 1*

(1) 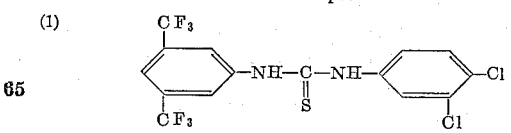

A solution of 16.2 grams of 3:4-dichloraniline in a small amount of acetonitrile is added to 27 grams of 3:5-bis-trifluoromethylphenyl isothiocyanate (boiling at 83° C. under 12 mm. Hg pressure). The reaction mixture heats up in a short time to 82° C.; it is heated for 1 hour on a boiling waterbath, and is then evaporated in vacuo to yield 3:5-bis-trifluoromethyl-3':4'-dichlorothiocarbanilide as a solid substance which is recrystallized from benzene. The purified product melts at 138–139° C.

(2) 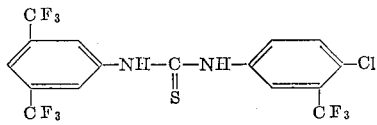

27.1 grams of 3:5-bis-trifluoromethylphenyl isothiocyanate are added to a solution of 19.5 grams of 3-amino-6-chloro-benzotrifluoride in 20 cc. of acetonitrile, and the whole is heated for 1 hour on a waterbath. The reaction mixture becomes slightly colored and thickly liquid. It is evaporated in vacuo, and then heated for 2 hours at 90° C. The crude solid product melts at 139–141° C. It is heated in a small amount of benzene in the presence of animal charcoal, and the filtered, warm solution is mixed with an equal volume of cyclohexane, whereupon 3:3':5-tri-trifluoromethyl-4'-chlorothiocarbanilide crystallizes out. It melts at 138.5 to 139° C.

(3) 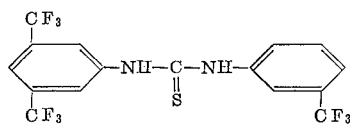

3:3':5-tri-trifluoromethyl-thiocarbanilide is prepared as described above under (2). The crude product is dissolved in hot benzene, mixed with animal charcoal and filtered, and the clear filtrate is mixed with an equal volume of cyclohexane, whereupon crystallization sets in. The product melts at 133–134° C.

(4) 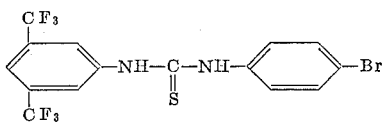

3:5-bis-trifluoromethyl-4'-bromo-thiocarbanilide is prepared in a corresponding manner. After recrystallization from a mixture of benzene and cyclohexane it melts at 163–164° C.

(5) 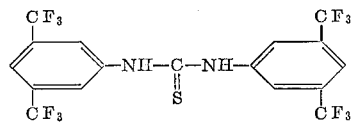

27.1 grams of 3:5-bis-trifluoromethylphenyl isothiocyanate are mixed with 22.9 grams of 3:5-bis-trifluoromethylaniline without the use of a solvent, and the mixture is heated on a boiling waterbath. The reaction mixture solidifies to a solid crystalline cake. After recrystallization from nitromethane and being washed with benzene, the resulting 3:3':5:5'-tetra-trifluoromethyl-thiocarbanilide melts at 184.5–186° C.

(6) 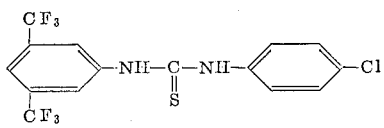

3:5-bis-trifluoromethyl-4'-chlorothiocarbanilide is prepared as described under (1) above. After recrystallization from a mixture of benzene and cyclohexane it melts at 150–151° C.

(7) 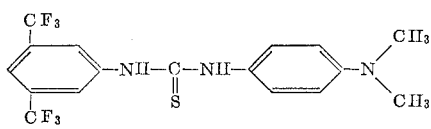

A mixture of 17.8 grams of para-N-dimethylaminophenyl-isothiocyanate and 22.9 grams of 3:5-bis-trifluoromethylaniline is heated for several hours on a boiling waterbath. The initially liquid reaction mixture solidifies in a short time to a crystalline mass, which is then expressed on a suction filter, and 3:5-bis-trifluoromethyl-4'-N-dimethylamino-thiocarbanilide is recrystallized from benzene. It melts at 167.5–170° C.

(8) 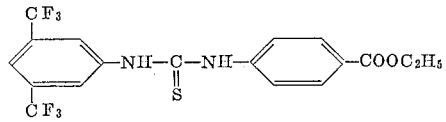

A solution of 16.5 grams of para-aminobenzoic acid ethyl ester in 15 cc. of acetonitrile is mixed with 27.1 grams of 3:5-bis-trifluoromethylphenyl isothiocyanate. After a short time the temperature rises to 65° C., and soon after 3:5-bis-trifluoromethyl-4'-carboxyethyl thiocarbanilide precipitates. It is dried in vacuo and recrystallized from acetonitrile. It then melts at 147.5–148° C.

(9) 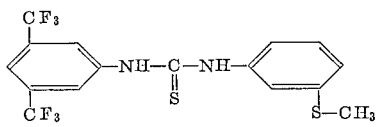

3:5-bis-trifluoromethyl-3'-thiomethyl thiocarbanilide is prepared from 3:5-bis-trifluoromethylphenyl isothiocyanate and freshly distilled 3-methylthioaniline. After recrystallization from a mixture of benzene and cyclohexane it melts at 125–127° C.

The following compound is prepared in an analogous manner:

(10) 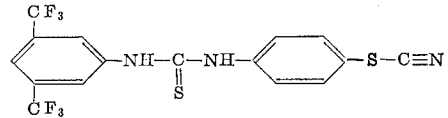

It melts at 122° C. after recrystallization from acetonitrile.

*Example 2*

(a) 10 grams of the active substance described under (1) in Example 1 and 2 grams of sulfite cellulose waste liquor are mixed with 100 cc. of water. The mixture is intensively ground to form a fine, stable dispersion, which can be diluted with water as desired.

(b) 7.5 parts of the emulsifier marketed under the trade name "Toximul MP" by Ninol Inc., Chicago, are dissolved in 72.5 parts of butanol, and 20 parts of the compound described under (1) in Example 1 are dissolved in the mixture. The solution can be diluted with water as desired.

(c) Tomato plants and celery plants were sprayed with solutions of 0.2% strength of each of the dispersions prepared as described under (a) and (b) above. 2 days after spraying, the tomato plants were infected with a spore suspension of *Alternaria solani* and of *Phytophthora infestans*, and the celery plants with a spore suspension of *Septoria apii*. The infected plants were kept for 2 days in an incubation chamber at a relative humidity of 95% to 100% and a temperature of 22–25° C. The effects produced on the celery plants were evaluated about 15 to 18 days, and those on the tomato plants 6 to 8 days, after the infection.

The fungicidal action of the preparations against *Septoria apii* on the celery was 100%, against *Alternaria solani* on the tomatoes 93%, and against *Phytophthora infestans* on the tomatoes 100%, with reference to the untreated control plants.

In the following table are given the results of further tests carried out under the conditions described under (c). Spray liquors were used that had been prepared as described under (b), except that they contained, instead of the active substance (1) of Example 1, the active substances given in the table.

| Active substance | Fungicidal action in percent | | |
|---|---|---|---|
| | Alternaria solani | Phythophthora infestans | Septoria apii |
| 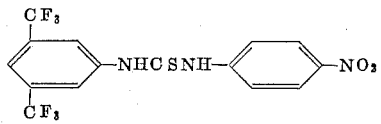 | 95 | 85 | 100 |
| 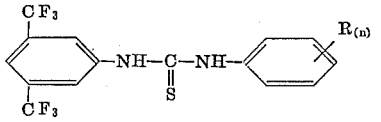 | 76 | 83 | 97 |
| 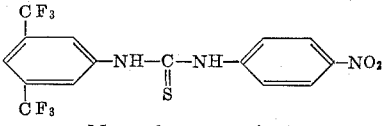 | 96 | 0 | 90 |

Similar results were obtained against the aforesaid fungi with the Compounds (5), (7) and (9) described in Example 1.

The other compounds described in Example 1 also exhibited a pronounced action against the aforesaid fungi that cause plant diseases.

*Example 3*

A solution of 5.0 g. of para-nitraniline and 10.0 g. of 3,5-bis-trifluoromethyl-phenylisothiocyanate in 50 ml. of dimethylformamide is heated at 80° C. for 4 hours. The batch is then cooled to room temperature, and 100 ml. of water added. The precipitate which forms is recrystallized from a mixture of dimethylformamide and water. There is obtained in this manner the 3,5-bis-trifluoromethyl-4'-nitro-thiocarbanilide of the formula

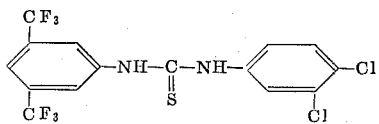

which melts at 175–177° C.

When tested according to the method set forth in Example 2, this compound showed a very good action against the phytopathogenic fungi set forth in Example 2.

What is claimed is:

1. A compound of the formula

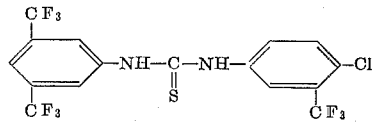

in which R represents a member selected from the group consisting of fluorine, chlorine and bromine atom, lower alkyl, lower alkoxy, —CF$_3$, —SO$_2$NH$_2$, —NO$_2$, —CN, —SCN, —NR$_2'$, —COOR', —SO$_2$R', —COR' and —SR' group, wherein R' has the meaning of a lower alkyl group and $n$ is a whole number of at most 3.

2. The compound of the formula

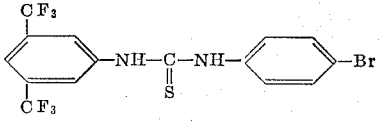

3. The compound of the formula

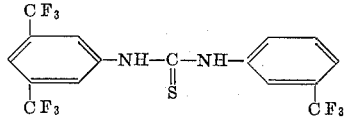

4. The compound of the formula

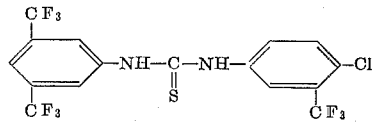

5. The compound of the formula

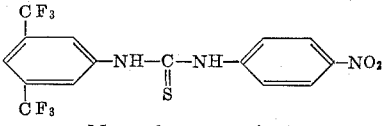

6. The compound of the formula

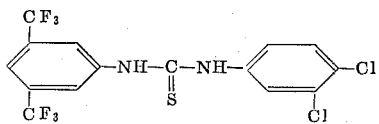

No references cited.

HENRY R. JILES, *Acting Primary Examiner.*